United States Patent Office 3,432,461
Patented Mar. 11, 1969

3,432,461
FLAME-PROOFING ADDITIVES AND RESINS
CONTAINING THE SAME
George R. Hill and Donald G. Needham, Bartlesville,
Okla., assignors to Phillips Petroleum Company, a corporation of Delaware
No Drawing. Filed July 8, 1966, Ser. No. 563,688
U.S. Cl. 260—45.75        7 Claims
Int. Cl. C08f 45/58, 29/02; C09k 3/28

ABSTRACT OF THE DISCLOSURE

Polymers are rendered both nonflammable and noncorrosive by the addition of at least one halogenated organic flameproofing compound, at least one tin compound such as di-n-butyl tin maleate or di-n-butyl tin glutaconate, and at least one metal oxide such as antimony trioxide.

---

This invention relates to a method for stabilizing polymers. This invention also relates to a stabilizer composition.

Heretofore polymers have been stabilized against burning, i.e. flameproofed, using halogenated organic compounds such as tetrabromobutane, dibromomethylbenzene, dibromopropanol, and the like, U.S. 3,093,599, the disclosure of which is incorporated herein by reference.

Heretofore some problem has been encountered in the corrosion of apparatus such as extruding equipment which processes these stabilized polymers. The steel and other similar metals from which conventional polymer processing equipment is made was observed to become pitted, discolored, dull in appearance, and otherwise corroded to varying degrees depending upon the particular stabilized polymers employed. It was found that the source of the corrosion problem lay in the presence of a halogenated organic flameproofing compound in the polymer being processed.

It was further found that the corrosion problem was obviated by incorporating in the stabilized polymer at least one material selected from the group consisting of dialkyl tin maleate, and dialkyl tin glutaconate, wherein the carboxylic groups of the maleic or glutaconic acid molecules are both bonded to the same tin atom, and wherein the alkyl radicals contain from 1 to 8 carbon atoms, inclusive.

Thus, by this invention there is provided a stabilizing additive which is substantially noncorrosive to conventional polymer processing equipment and which consists essentially of at least one conventional halogenated organic flameproofing compound, at least one of the above-described dialkyl tin maleate and dialkyl tin glutaconate, and at least one of arsenic trioxide, antimony trioxide, and bismuth trioxide.

The method according to this invention relates to stabilizing a polymer by incorporating in that polymer an effective stabilizing amount of the above-described stabilizing additive.

The stabilizing composition of this invention is useful as a noncorrosive additive for flameproofing the polymers to which it is added and the polymers themselves are useful for making any number of articles known at present including bottles such as baby bottles, plates, toys, tote boxes, and the like. Similarly, the method of this invention is useful for flameproofing polymers while rendering or at least maintaining the polymers themselves substantially noncorrosive and which polymers have similar utility as that discussed with reference to the stabilizing composition above.

Accordingly, it is an object of this invention to provide a new and improved method for stabilizing a polymer or polymer composition, particularly as to the combustibiliy and corrosivity of that polymer. It is another object to provide a new and improved stabilizing composition useful for addition to polymers to flameproof the polymer and render or at least maintain same substantially noncorrosive.

Other aspects, objects, and the several advantages of this invention will be apparent to those skilled in the art from the description and appended claims.

By this invention substantially any halogenated organic flameproofing compound can be used, preferred compounds being organic polybromine compounds, still more preferably polybrominated hydrocarbons such as hexabromocyclododecane, hexabromocyclododecatriene, and the like. A particularly preferred group of flameproofing compounds are those having the formula

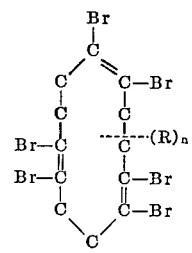

wherein R is selected from the group consisting of alkyl radicals having 1 or 2 carbon atoms per molecule, inclusive, n is an integer from 0 to 6, and the total number of carbon atoms in all R groups present in the formula does not exceed 6. R can be bonded to from one up to all of the carbon atoms that do not have a bromine atom attached thereto. More than one R group can be bonded to a single carbon atom. The halogenated organic compounds are known per se and can be made by methods obvious to one skilled in the art such as by brominating cyclododecatriene by adding three equivalents of bromine per equivalent of cyclododecatriene at about room temperature using ethyl alcohol as a solvent. Therefore, production of these compounds will not be discussed in detail.

The dialkyl tin maleate and dialkyl tin glutaconate compounds can contain alkyl radicals which contain from 1 to 8 carbon atoms, inclusive. In these compounds both carboxylic groups of either the maleate radical or the glutaconate radical are bonded to the tin atom of each molecule. For example, the formula for di-n-butyl tin maleate would be as follows:

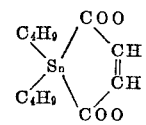

These compounds can be made by reacting equimolar quantities of di-n-butyl tin dichloride with disodium salt of maleic acid at about 50° C. in a nonaqueous solvent for the tin compound.

The amounts of each of the halogenated organic flameproofing compound, the tin containing compounds, and the arsenic, antimony, or bismuth containing compounds employed in the composition of this invention will vary widely depending upon the particular materials employed in that composition and the polymer to which the composition is to be added. Generally, in the composition which is to be added to the polymer, the amount of flameproofing compound will vary from about 1 to about 95 weight percent, the amount of arsenic, antimony, and bismuth containing compounds will vary from about 1 to about 95 weight percent, and the amount of dialkyl tin maleate and/or dialkyl tin glutaconate will vary from about 0.1 to about 65 weight percent, all weight percents being based on the total weight of the composition.

The polymer stabilizing composition of this invention can also contain other conventional additives such as heat stabilizers, antioxidants, ultraviolet light stabilizers, and the like or these additives can be separately incorporated into the polymer in the amount of 0.01 to 10 weight percent based on the total weight of the polymer. Particularly preferred additives are the conventional heat stabilizers and antioxidants such as 2,6-di-tertiary-butyl-para-cresol, di-ortho-cresylol propane, diphenyl-para-phenylene diamine, di-beta-naphthyl-para-phenylene diamine, phenyl-alpha-(or beta)-naphthylamine, 2,2'-methylbene-bis-(4-ethyl-6-tert-butylphenol), 4,4' - thio-bis - (6-tert-butyl-3-methylphenol), 4,4' - methylene-bis(2,6-di-tert-butylphenol), 4,4'-thio-bis(2-methyl-6-tert-butylphenol), and the like.

The stabilizing composition of this invention can be formed in any conventional manner including dry, melt, or solution blending and the like, the presently ultimately desired result being intimate mixing of the compounds from which the composition is formed. When dry mixing, the compounds formed in the stabilizing composition should be subdivided, e.g. powdered, for best mixing. The compositions can also be formed by dry mixing the constituents and thereafter melt or solution blending same so that a very intimate mixture is ultimately obtained.

The stabilizing composition can be incorporated into the polymer in any conventional manner including both dry and melt blending techniques. For example, the stabilizing composition in powdered form can be dry blended with polymer particles or pellets, with or without a dispersing agent such as an organic oil, and the mixture of powdered stabilizing composition and particulate polymer is then melt blended and/or extruded. Here again a presently desired ultimate objective is an intimate mixture of the polymer and the stabilizing composition.

The amount of stabilizing composition present in the polymer can vary widely depending upon the particular composition, polymer, and the degree of flameproofing and corrosion protection desired but will generally be in the range of from about 0.001 to about 15, preferably from about 0.01 to about 10, weight percent based upon the total weight of the polymer.

This invention is applicable to the stabilization of substantially any flammable polymer and is particularly amenable to polymers formed from one or more 1-olefins having from 2 to 8 carbon atoms per molecule. The invention is applicable to homopolymers and copolymers and mixtures of two or more homopolymers and/or copolymers.

Generally, conventional polymer processing apparatus such as extrusion machines, and the like are formed from carbon steel and similar materials and it is these conventional machines now employed in the industry that are susceptible of corrosion including pitting, oxidation, and the like when processing flameproofed polymer.

Example

Polypropylene having a melt flow of 4.5 (ASTM D 1238–62T, Condition L) was formed into two separate compositions, one composition containing 1 weight percent hexabromo-1,5,9-cyclododecatriene and 2 weight percent antimony trioxide, and the other composition containing two weight percent hexabromo-1,5,9-cyclododecatriene, 4 weight percent antimony trioxide, and 0.25 weight percent of di-n-butyl tin maleate, all weight percents being based upon the total weight of the polypropylene.

Each composition was mixed in a Banbury mixer at 330° F. and then injection molded at 440° F. in a conventional plunger type injection molding machine made from soft steel.

The internal parts of the injection molding machine which was used to mold the composition containing the antimony trioxide and which came in contact with that composition were corroded as evidenced by discoloration and dullness of appearance of those parts. The internal parts of the injection molding machine used to mold the composition containing the dibutyl tin maleate remained substantially smooth and shiny thereby indicating substantially no corrosion was effected by that composition. Both compositions are substantially nonflammable when contacted by an open flame.

Reasonable variations and modifications are possible within the scope of this disclosure without departing from the spirit and scope thereof.

We claim:

1. An additive for rendering polymers both nonflammable and noncorrosive consisting essentially of (1) at least one flameproofing compound selected from the group consisting of tetrabromobutane, dibromomethylbenzene, dibromopropanol, hexabromocyclododecane, and compounds having the formula

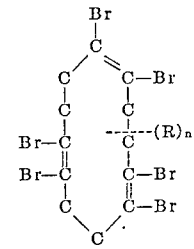

wherein R is selected from the group consisting of alkyl radicals having 1 or 2 carbon atoms per molecule, inclusive, n is an integer from 0 to 6, and the total number of carbon atoms in all R groups present in the formula does not exceed 6, (2) at least one material selected from the group consisting of dialkyl tin maleate and dialkyl tin glutaconate, wherein both carboxylic groups of either the maleate radical or the glutaconate radical are bonded to the same tin atom, and wherein the alkyl radicals contain from 1 to 8 carbon atoms, inclusive, and (3) at least one of arsenic trioxide, antimony trioxide, and bismuth trioxide.

2. The composition according to claim 1 wherein the flameproofing additive is present in an amount of from about 1 to about 95 weight percent, the arsenic, antimony, and bismuth containing compounds are present in the amount of from about 1 to about 95 weight percent, and the tin maleate and/or glutaconate compounds are present in the amount of from about 0.1 to about 65 weight percent, all weight percents being based on the total weight of the composition.

3. A polymer formed from at least one 1-olefin having from 2 to 8 carbon atoms per molecule, inclusive, containing from about 0.001 to about 15 weight percent, based upon the total weight of the polymer, of the composition of claim 1.

4. The composition according to claim 1 wherein said composition contains at least one additional polymer stabilizer selected from the group consisting of a heat stabilizer and an antioxidant.

5. The composition according to claim 4 wherein said additional stabilizer is 2,6-di-tertiary-butyl - 4 - methylphenol.

6. The composition according to claim 1 wherein said flameproofing compound is hexabromo-1,5,9-cyclododecatriene and said tin containing material is di-n-butyl tin maleate, and said trioxide is antimony trioxide, the cyclododecatriene compound being present in the composition in an amount of from about 1 to about 95 weight percent, the antimony trioxide being present in an amount of from about 1 to about 95 weight percent, and the di-n-butyl tin maleate being present in an amount of from about 0.1 to about 65 weight percent, all weight percents being based on the total weight of the composition.

7. The composition according to claim 1 wherein said flameproofing compound is hexabromo-1,5,9-cyclododecatriene, said trioxide is antimony trioxide, and said tin containing material is di-n-butyl tin glutaconate, the cyclododecatriene compound being present in the composition in an amount of from about 1 to about 95 weight percent, the antimony trioxide being present in the amount of from about 1 to about 95 weight percent, and the di-n-butyl tin glutaconate being present in an amount of from about 0.1 to about 65 weight percent, all weight percents being based on the total weight of the composition.

References Cited

UNITED STATES PATENTS

| | | | |
|---|---|---|---|
| 3,025,262 | 3/1962 | Peters | 260—45.75 |
| 3,093,599 | 6/1963 | Mueller et al. | 260—2.5 |
| 3,250,739 | 5/1966 | Sauer et al. | 260—45.75 |

DONALD E. CZAJA, *Primary Examiner.*

V. P. HOKE, *Assistant Examiner.*

U.S. Cl. X.R.

260—45.7, 45.95, 45.9; 252—8.1